United States Patent [19]

Eckhart

[11] Patent Number: 5,547,116
[45] Date of Patent: *Aug. 20, 1996

[54] BRACKET FOR MOUNTING A CARRIER ON A VEHICLE

[76] Inventor: Richard A. Eckhart, P.O. Box 7299, Thousand Oaks, Calif. 91359

[*] Notice: The term of this patent shall not extend beyond the expiration date of Pat. No. 5,449,100.

[21] Appl. No.: 436,977

[22] Filed: May 8, 1995

Related U.S. Application Data

[63] Continuation-in-part of Ser. No. 101,365, Aug. 2, 1993, Pat. No. 5,449,100.

[51] Int. Cl.⁶ ......................................................... B60R 9/08
[52] U.S. Cl. ........................... 224/509; 224/510; 224/521; 224/532; 224/535; 224/536; 224/917.5; 414/462; 403/108; 403/109; 403/292; 403/378
[58] Field of Search ..................................... 224/282, 502, 224/509, 510, 521, 524, 529, 532, 535, 536, 917.5, 924; 403/108, 109, 292, 377–379; 414/462

[56] References Cited

U.S. PATENT DOCUMENTS

| | | | |
|---|---|---|---|
| 2,921,653 | 1/1960 | Cale | 403/378 X |
| 4,915,276 | 4/1990 | Devito | 224/521 |
| 5,244,133 | 9/1993 | Abbott et al. | 224/521 |

Primary Examiner—J. Casimer Jacyna
Attorney, Agent, or Firm—Ashen, Golant & Lippman

[57] ABSTRACT

An improved bracket for mounting a carrier on a vehicle for carrying various articles such as skis and ski poles, bicycles and luggage. The illustrated bracket supports the carrier at the rear of the vehicle. The bracket is firmly and rigidly supports the carrier so as to limit tilting or swaying of the carrier as the vehicle moves. In a preferred form the bracket allows the carrier to be moved out of the way when access to the rear of the vehicle is desired. One form of illustrated carrier, for carrying (1) skis and ski poles and (2) bicycles, includes an elongated upright section that supports holder units for holding those articles. Another form of illustrated carrier, for carrying luggage, simply extends rearwardly and supports a horizontal platform.

12 Claims, 8 Drawing Sheets

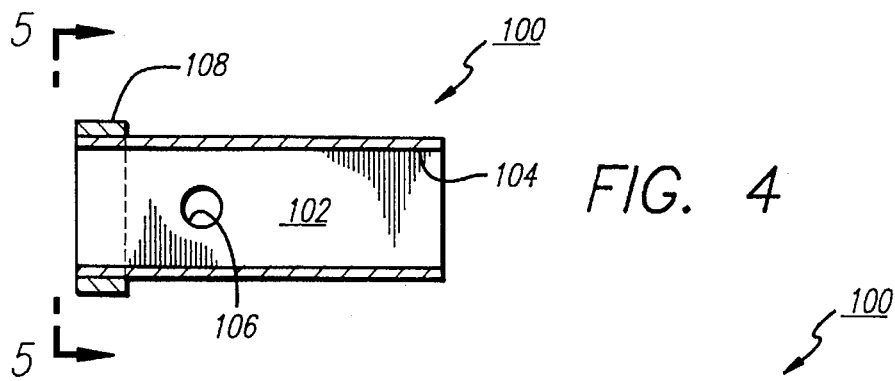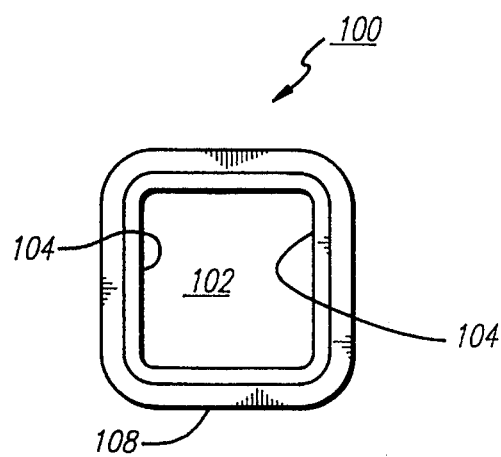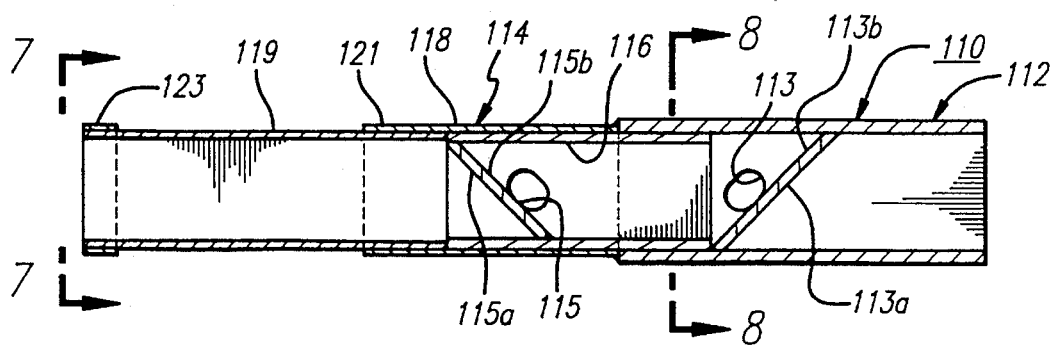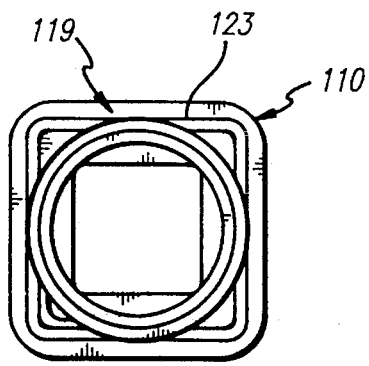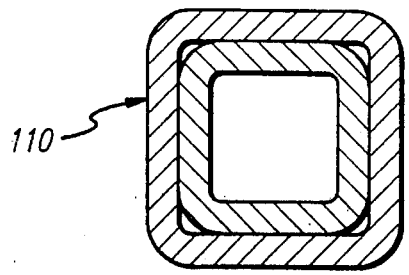

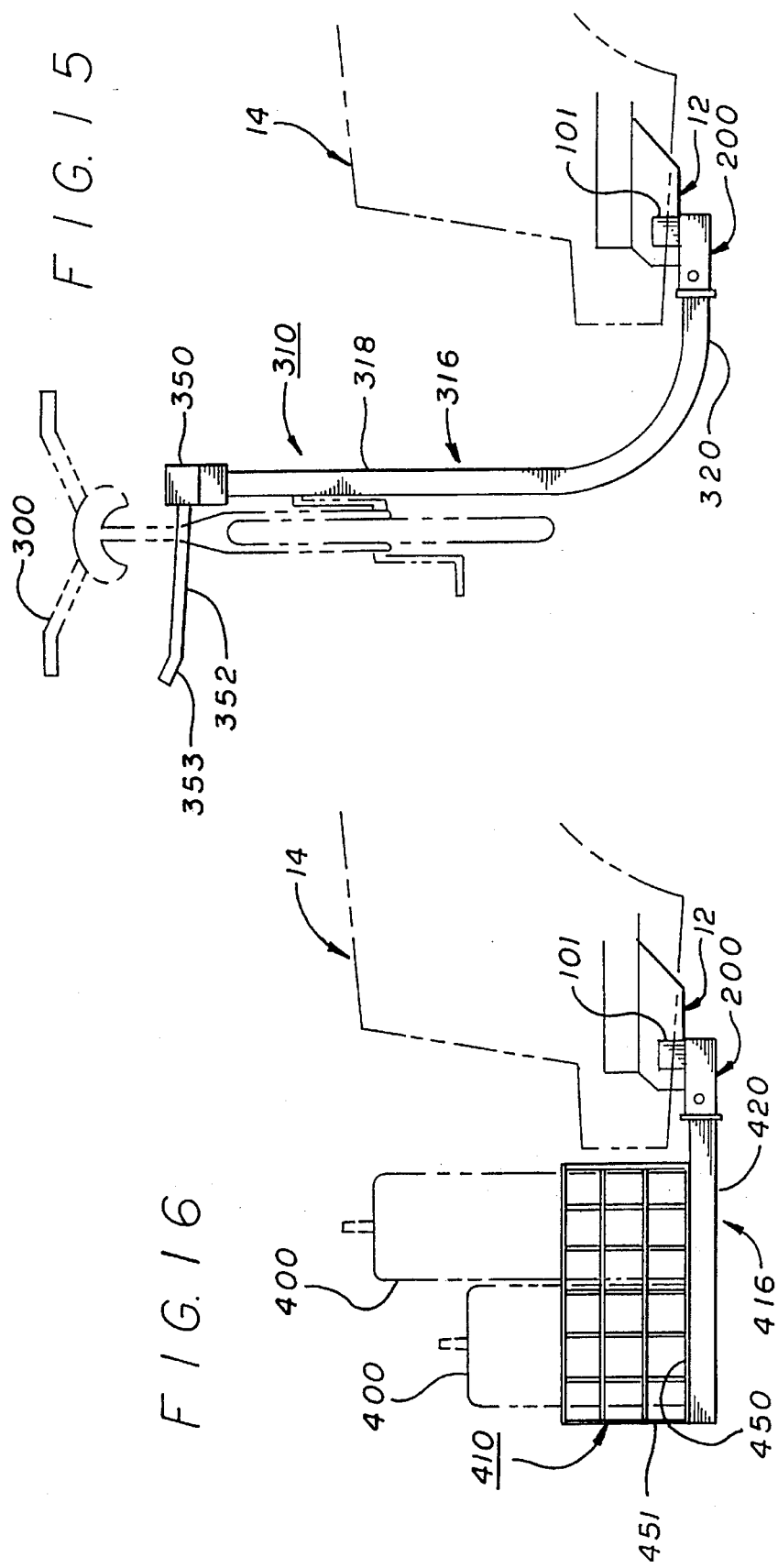

BRACKET FOR MOUNTING A CARRIER ON A VEHICLE

FIELD OF THE INVENTION

This application is a continuation-in-part of application Ser. No. 08/101,365, filed Aug. 2, 1993, now U.S. Pat. No. 5,449,100, as to which priority is requested under 35 U.S.C. §§120.

BACKGROUND OF THE INVENTION

There are many prior art brackets for mounting carriers on vehicles for transporting articles such as 1) for skis and ski poles, 2) bicycles and 3) luggage. A major problem has been the failure of such brackets to firmly and rigidly hold the carrier while the vehicle was being driven, often over rough, bumpy terrain.

A related problem of the carriers that have an upright section is a tendency for the upright section to sway from side to side as the vehicle is driven. This may not be harmful in fact, but appears problematic to the user and is therefore undesirable from a practical marketing viewpoint.

SUMMARY OF THE DISCLOSURE

The illustrated bracket addresses itself to various of these deficiencies of the prior art.

The illustrated mounting bracket firmly and rigidly supports carriers and in particular limits side to side swaying of carriers that have elongated upright sections. More particularly, the illustrated bracket includes in interlocking and camming arrangement or mechanism that firmly and rigidly locks the bracket and the carrier to the vehicle.

The illustrated mounting bracket may also allow easily movement, when desired, of the carrier to afford access to the vehicle. More particularly, the illustrated bracket is normally locked in position to hold the carrier in its transporting position at the rear of the vehicle. The bracket may be unlocked to allow at least portions of the carrier to be moved to the side away from the vehicle rear so as to provide access to a tire or a rear door or panel of the vehicle.

IN THE DRAWING

FIG. 4 is a schematic side view of a first portion of the bracket that supports the carrier on the vehicle.

FIG. 5 is a schematic end view of the portion of FIG. 4, as viewed from the left on FIG. 4.

FIG. 6 is a schematic side view of a second portion of the bracket.

FIG. 7 is a schematic end view of the portion of FIG. 5, as viewed from the left.

FIG. 8 is a schematic sectional view taken generally along, 8—8 of FIG. 10.

FIG. 15 is a schematic side view of the bracket and carrier of FIG. 14.

FIG. 16 is a schematic side view of the bracket and carrier for luggage.

DETAILED DESCRIPTION OF THE DRAWINGS

Figure 1:
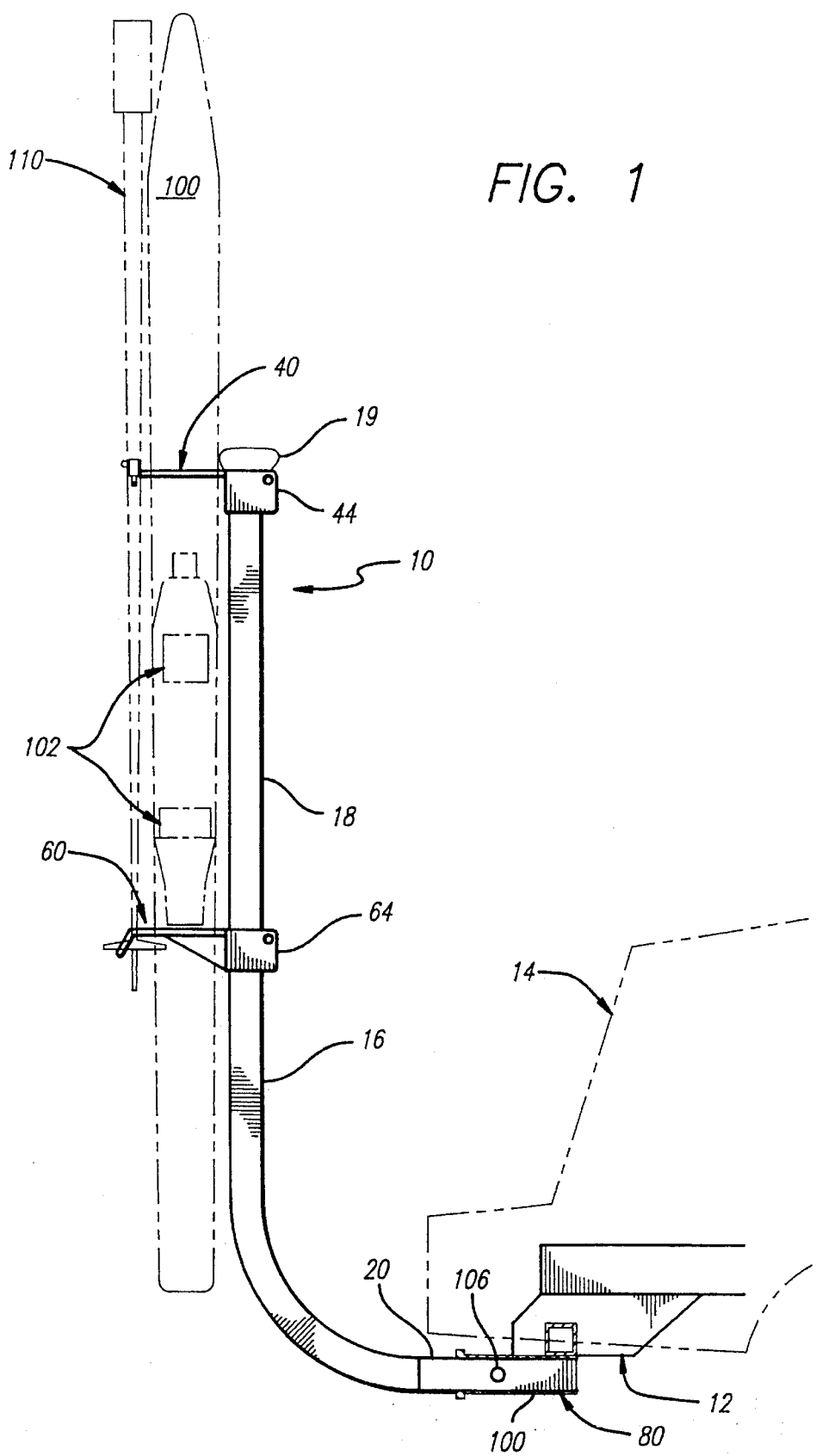
FIG. 1 is a schematic side view of a mounting bracket comprising a presently preferred embodiment of the invention, shown mounted at the rear of a motor vehicle and supporting a carrier for skis and poles.
Figure 17:
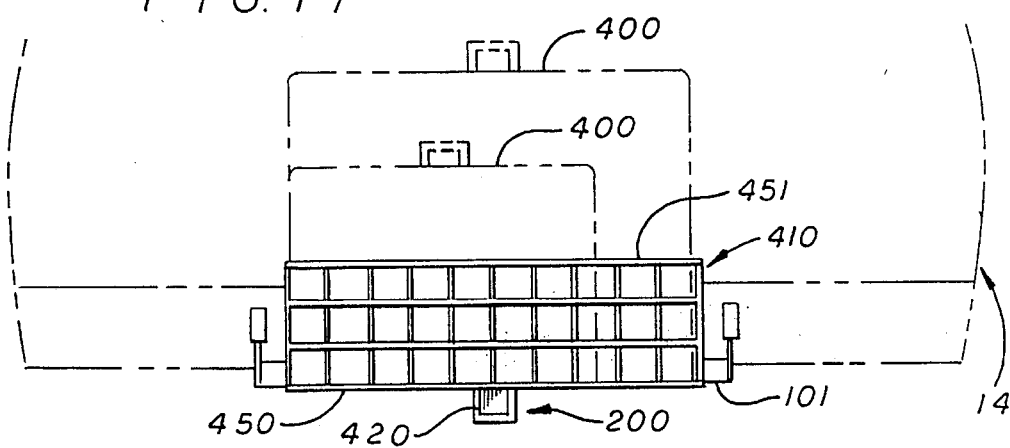
FIG. 17 is a schematic rear view of the bracket and carrier of FIG.16.

FIG. 1 illustrates schematically the bracket 80 which is a presently preferred form of the invention, mounted to the trailer hitch 12 of a motor vehicle 14. The bracket 80 is shown supporting a carrier 10 for skis and ski poles. The bracket 80 may also support other carriers such as a carrier 310 for bicycles (FIGS. 14 and 15) and a carrier 410 for luggage (FIGS. 16 and 17).

CARRIER FOR SKIS AND POLES

Figure 2:
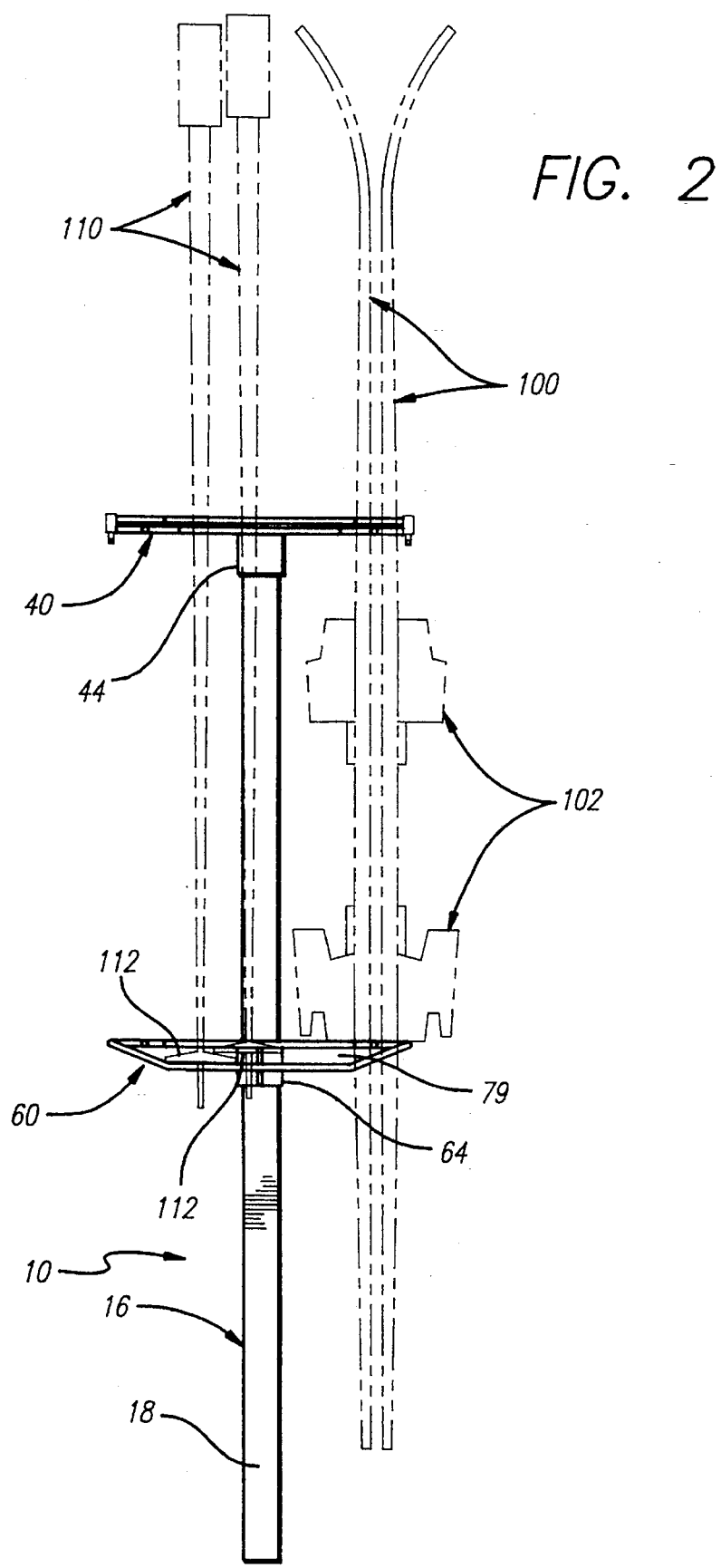
FIG. 2 is a schematic rear view of the ski and pole carrier of FIG. 1.
Figure 3:
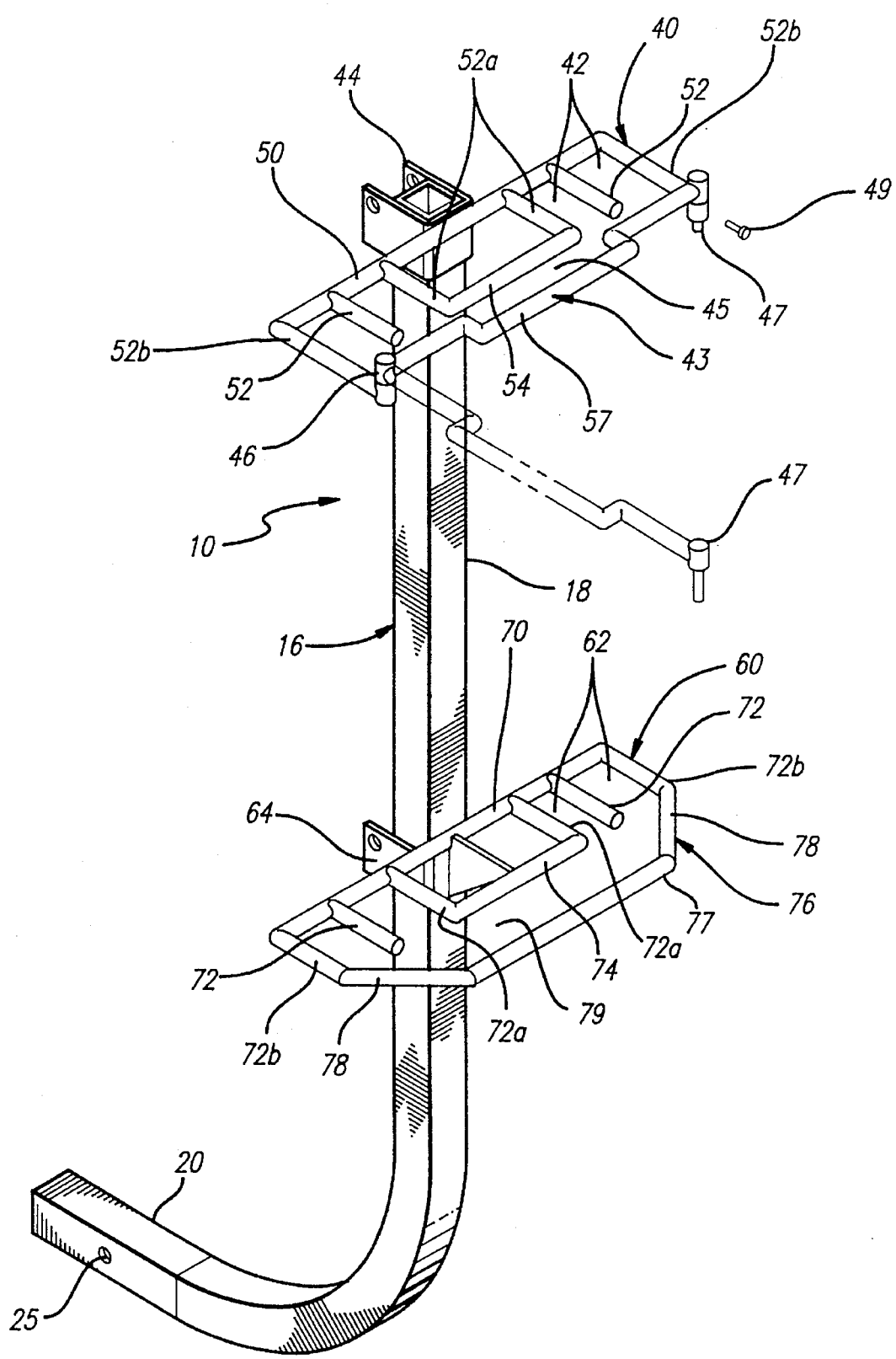
FIG. 3 is a schematic perspective view of the carrier, showing upper and lower holder units and with the gate on the upper unit shown in broken line in its open position.

The carrier 10 for skis and ski poles is illustrated on FIGS. 1–3. Carrier 10 includes a support structure or frame in the form of an elongated rigid bar or rod 16 which is generally L-shaped and made of a strong tough material such as steel or metal allow. The frame rod 16 includes a main upright section 18 and a forwardly extending lower support section 20. The lower support section 20 is releasibly locked by the bracket 80 to the trailer hitch 12 at the rear underside of the vehicle. The upright section 18 is normally and desirably positioned generally centered side-to-side of the vehicle.

A pair of holder units are mounted on the upright frame rod section 18: an upper holder unit 40 and a lower holder unit 60. FIGS. 1 and 2 illustrate, in broken line, the positions of a pair of skis 100 and a ski poles 110 mounted on the illustrated carrier 10. In general, the skis and poles are mounted upright, with the upper end portions of the skis extending through individual mating receptacles 42 in the upper holder unit, and with the lower end portions at the other end of the skis extending through individual mating receptacles 62 in the lower holder unit. The upper unit 40 has an openable gate 43 (shown in FIG. 3 in its closed position in solid line and in its open position in broken line). The upper and lower units 40, 60 are spaced-apart so that the bindings 102 of the skis are positioned between the two units. In this way, the lower holder unit 60 also engages the bindings 102 to provide vertical support for the skis.

This ski and pole carrier 10 is described in detail in copending U.S. application, Ser. No. 08/101,365, now U.S. Pat. No. 5,449,100.

THE BRACKET

FIGS. 4–11 illustrate the improved bracket 80 for supporting a carrier on a vehicle. These drawings illustrate the bracket 80 supporting a carrier having a frame or support structure in the form of a generally L-shaped elongated rigid bar or rod that includes an upright support section and a lower generally horizontal support section. Such carriers with upright sections are carrier 10 for skis and poles and carrier 310 for bicycles. Carrier 410 for luggage, which has a rod with only a lower support section, will be discussed in detail below. For ease of description, the bracket 80 will initially be described in relating to the ski carrier 10.

It is of particular importance that the bracket 80 hold the upright section 18 of the carrier 10 firmly and solidly in its upright position as the vehicle is driven.

Further, the appearance of stability is of importance to the purchasers and users of such a carrier. The upright rod or section 18 is visible to the driver and the other occupants of the vehicle through the rear window as the vehicle is being driven. The motion of the vehicle as it proceeds along a roadway, as it goes over bumps or irregularities and as it turns, applies substantial forces to the upright rod and the carrier parts as well as the skis and poles being carried. In particular, there is a tendency for the rod to sway from side to side since it is a large upright arm secured at the bottom and having substantial weight at the upper portions that exert side-to-side force. The side-to-side movement or swaying can be particularly unnerving and upsetting to the driver of the vehicle looking in the rear view mirror and observing such movement. Even if such movement is not in fact harmful, it is highly desirable from a marketing and merchandising standpoint to have a product that minimizes such side-to-side saying or movement.

In addition as noted above, the bracket 80 may allow the upright rod or section 18 of the carrier (and the holder units 40, 60 and skis and poles that it supports), to be selectively moved out of the way to provide access to the rear of the vehicle. For example, this would provide access to a tire mounted at the rear of the vehicle or to rear door or hatch to the vehicle. The bracket 80 would normally maintain the section 18 in its upright position. The illustrated bracket may be selectively unlocked or unlatched, however, to allow the upright section to move or pivot about its lower end to one side, to provide the desire access.

The illustrated bracket 80 is desirable fabricated from a strong, durable, rigid material such as steel or various metal allows.

Figure 9:
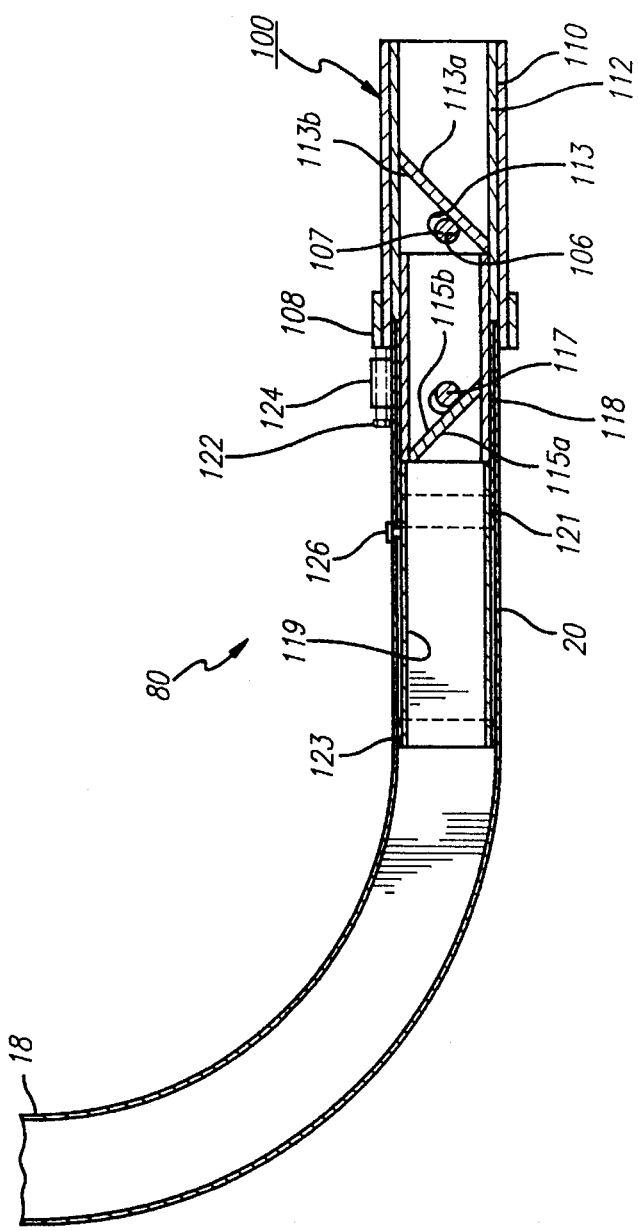
FIG. 9 is a schematic side view of the carrier assembled with the bracket.

In general, as shown in FIG. 1, the illustrated bracket 80 comprises a first tubular bracket portion 100 that is solidly and rigidly connected (as by welding) to a crossbar 101 of a trailer hitch 12 that is secured to the underside of the vehicle 14 by suitable means (not shown). The first bracket portion 100 solidly and rigidly receives and retains a second bracket portion 110 (FIG. 9). The second bracket portion 110 normally rigidly and firmly receives and supports the horizontal forward extension or support section 20 of the rod 16 of the carrier 10 (FIG. 9), thereby supporting the upright section 18 of the rod. The connection between the second bracket portion 110 and the rod section 20 also permits the rod 16 (and its load) to be unlocked, shifted rearwardly and then pivoted to the side to provide access to the rear of the vehicle.

More particular, as shown in FIGS. 4 and 5, the first bracket portion 100 is elongated and generally square in cross-section, having an elongated internal receptacle 102 that is square in cross-section and has a rearwardly opening square entrance or mouth 104.

Referring to FIGS. 6, 7, and 8, the illustrated second bracket portion 110 has an elongated first or forward section 112 that is generally square in cross-section externally for being received in a close sliding fit within the receptacle 102 of the first portion 100. The illustrated forward section 112 is rigidly connected (as by welding or other suitable means) to a rearwardly extending central section 114 that also has a generally square exterior cross-section. The exterior size of the central section 114 is somewhat smaller than the exterior size of the forward section 112. The central section 114 may be fabricated from a plurality of pieces that are firmly and rigidly secured to one another in a permanent way as by welding or the like.

As shown best in FIG. 6, the illustrated central section 114 is formed from a tubular inner piece 116 and a tubular outer piece 118. Both pieces 116, 118 are generally square in cross-section. The outer piece 118 has a relatively thin wall and its forward end abuts the rearward end of the section 112. The exterior of the outer piece 118 defines an elongated exterior surface that is generally square in cross-section as somewhat smaller in cross-section than the exterior surface of the first section 112 by slightly more than the thickness of the extension 20. The interior piece 116 has a thicker wall and its forward end is permanently fixed within the rearward end of the forward section 112. The rearward end of the outer piece 118 extends a distance rearwardly from the rearward end of the inner piece 116.

The second bracket portion 110 further includes an elongated rearward section 119 that has a circular exterior cross-section (FIG. 7). The details and function of portion 110 will be described below.

Figure 10:
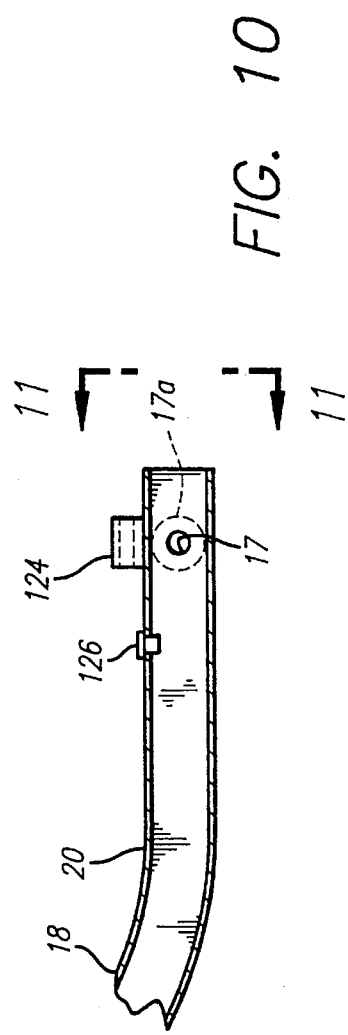
FIG. 10 is a schematic side view of the forward extension of the carrier.

As shown in FIGS. 10 and 11A, the elongated forward extension 20 of the upright carrier rod 18 is square in cross-section and has a hollow elongated interior that is square in cross-section and closely matches the exterior square cross-section of the outer piece 118 of the central section 114. When the carrier and the bracket are assembled a shown in FIG. 9, the forward extension 20 is telescoped over the outer piece 118, with the forward end of the extension 20 in close proximity to the rearward end of the forward section 112. Similarly, the forward section 112 and the forward end of the extension 20 are telescoped within the first bracket portion 100. These telescoping engagements of structure with square cross-sections generally prevent relative rotation and generally maintain the carrier rod section 18 upright.

The arrangement that holds the extension 20 to the bracket and the bracket portions 100, 110 to one another in a firm, rigid, nontilting manner will now be described. In general, a pair of transverse channels are formed in the structures. More particularly as shown best in FIG. 4, the first bracket portion 100 has a pair of opposed holes 106 that define a channel that extends generally transversely of the portion and intersects the axis of the portion. These illustrated holes 106 are circular and have a diameter of approximately ⅝ inch. A locking pin 107 of slightly small diameter in cross-section may be inserted transversely through these holes 106 (see FIG. 9), with portions of the pin extending outwardly at either side of the first portion 100. The transverse locking pin 107 may be formed with a suitable handle portion at one end (not shown) for ease of handling. The pin 107 may be selectively maintained in place as by a suitable lock, clip or the like (not shown).

As shown best in FIG. 5, the forward section 112 of the middle or second portion 110 has a pair of opposed side openings 113 that are generally aligned with the openings 106 of the first portion 100 when the middle portion 110 is assembled with the first portion. These openings 113 also form a transverse channel. As shown best in FIG. 9, the channel formed by the openings 113 includes a main channel section that for the most part overlays and coincides with the main channel section formed by the openings 106. The openings 113 however are somewhat enlarged, extending upwardly and forwardly as seen in FIGS. 6 and 9 to provide a secondary channel section. As seen in cross-section the channel of openings 113 is in the shape of an elongated slot that has one end centered at the central axis of the bracket portions and that then is inclined or angled away from that central axis. The illustrated openings 113 have rounded corners, however the openings could be other shapes such as inclined rectangles and the locking pin 107 could also have different matching shapes such as square in section. This arrangement creates camming or wedging surfaces at the edges of the openings 113 which act to firmly and solidly lock the center portion 110 to the forward portion 100 as will be described below. In general, the center portion 110 is moved axially rearwardly a short distance relative to the forward portion 100, causing the surfaces of the openings 106, 113 to engage the transverse locking pin 107, which in turn causes the middle or center portion 100 to be jammed or wedged downwardly into a firm, rigid, locked relationship with the forward portion 110.

Figure 11:
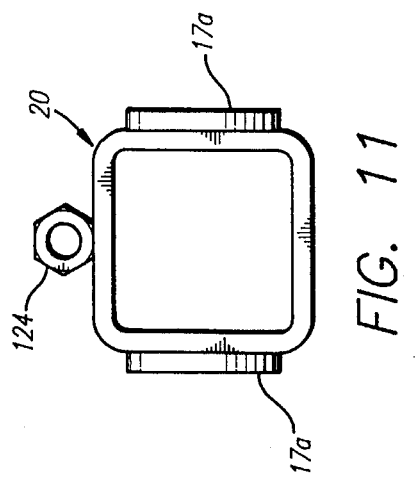
FIG. 11 is a schematic end view of the extension of FIG. 10, as viewed from the right.

As shown in FIG. 10, the forward extension 20 has a similar pair of transverse channel-forming circular opposed holes 17. These holes 17 may be reenforced by a pair of washers 17a each secured as by welding at opposite sides of section 20 (as shown in FIG. 11), with the central holes in the washers aligned respectively with the holes 17. As shown in FIGS. 6 and 9, the center bracket portion 110 has a second pair of enlarged channel-forming holes 115 similar to holes 113 (elongated slots in section). The holes 115 extend through the inner piece 116 and the outer piece 118. The holes 115 are enlarged in the upward rearward direction. Thus, when the extension 20 is moved axially relative to the middle portion 110, the same kind of wedging and jamming action is provided by the interface between a second transverse locking pin 117 (FIG. 9) that is positioned through the openings 17 and 115. This jams and wedges the center bracket portion 112 relative to the forward extension 20 of the carrier rod to maintain them in fixed rigid relationship with one another. The pin 117 may have suitable means such as a lock or clip (not shown) to selectively hold it in place.

This relative axial movement is achieved by set screw 122 which is mounted in a block 124 fixed to the outside of the forward extension 20 (see FIGS. 9 and 10). The set screw 122 is threaded through the block 124 and abuts the rearwardly facing end of the forward carrier portion 100. In this regard, the portion 100 has a square outer ring 108 permanently fixed to the rearward end of the main part of the portion 100. Advancing the set screw 122 in the forward direction urges the extension 20 rearwardly relative to the central bracket portion 110, and also urges the second bracket portion rearwardly relative to the forward bracket portion 100. This creates the relative axial movement between the forward and central bracket portions 100, 110 and between the central bracket portion 110 and the extension 20 to lock or wedge these parts to one another and restrict or limit relative rotation and side to side sway of the carrier upright section 18.

In one regard, the specific construction of the bracket 80 as shown and disclosed in parent application 08/10,365 has been improved. Referring to FIGS. 6 and 9, which sown the bracket center portion 110, it will be noted that structure has been added to strengthen and prolong the life of the transverse channels formed by openings 115 and 113. It was found that the locking/wedging action of the transverse locking pins 117 and 107 in the respective openings 115 and 113 had a tendency to produce wear and deformation along the edges of the openings 115, 113. To counteract and compensate for this, angled transverse plate sections 115a and 113a have been secured (as by wedging) adjacent to openings 115 and 113, respectively. The plate sections 115a, 113a have their upper inclined surfaces 115b, 113b aligned with the lower inclined edges of the adjacent openings 115, 113 so that the transverse pins 117, 113 bear against the plate section surfaces 115b, 113b and the edges of the openings 115, 113 are thereby protected from the deforming injury noted above.

The illustrated bracket 80 also allows for the carrier 10 to be tilted to the side to provide access to the rear of the vehicle.

The bracket center portion 110 has the elongated rearward section 119 that is circular in exterior cross-section (FIG. 7). The section 119 is permanently secured to the rearward end of the center section 114. In particular, the forward end of section 119 is telescoped into the rearward end of the outer piece 118 and into abutment or close proximity to the rearward end of the inner piece 116. A pair of tubular circular outer rings 121, 123 are permanently fixed to the section 119. One ring 123 is at the rear end of section 119. The other ring 121 is adjacent to the rear end of the outer piece 118. These rings 121, 123 are received in a close sliding fit within the extension 20 so that when the locking pin 117 is removed from holes 115, 17, the extension 20 cal slide rearwardly relative to the bracket.

A locking bolt or screw 126 is threaded through the wall of the extension 20 to engage the ring 123 to prevent the extension being unintentionally moved rearwardly so as to separate the extension from the bracket. To allow the extension 20 to be completely removed from the bracket, the bolt 126 may be sufficiently withdrawn to allow the ring 123 to pass.

When the extension 20 is unlocked by removal of the pin 117 and is slid rearwardly so that the square extension no longer is telescoped onto the square outer piece 118, the extension is then free to rotate about the circular section 119 and its rings 121, 123. This allows the carrier and its load to be moved to the side. Suitable mechanical stops (not shown) may be provided to limit this rotation and sideward movement.

Figure 13:
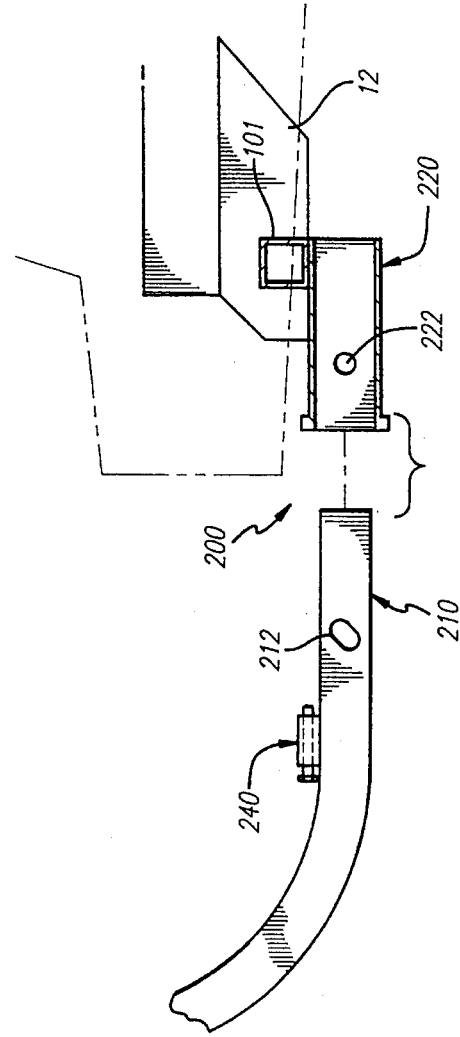
FIG. 13 is a schematic side view of the bracket of FIG. 12, in its pre-assembled condition.
Figure 14:
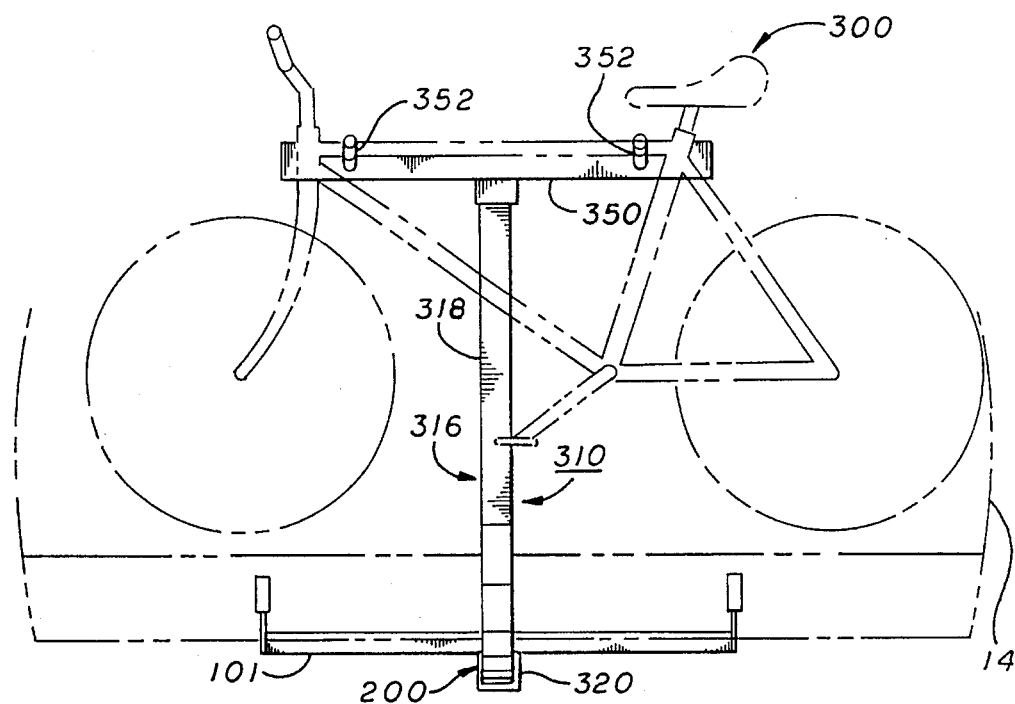
FIG. 14 is a schematic rear view of the bracket and a carrier for bicycles.

The bracket may be utilized in a simplified form 200, as shown in FIGS. 13 and 14, which does not provide the selective pivoting movement. Bracket 200 comprises a pair of elongated portions 210, 220 that are noncircular in cross-section and telescopically fit together. One portion 210 may be fixed to or may be formed as a lower, forwardly directed extension of the carrier rod 16, and the other portion 220 may be fixed to the vehicle as described above. Each portion 210, 220 has mean as defining a transverse channel 212, 222. One channel 212 has a main section that is generally circular in cross-section and the other channel 222 has a main section that generally coincides with the first channel 212. In addition the channel 212 has a secondary section that extends away from the main section and is at an angle to the common axis of the portions. A locking pin (not shown) is provided for extending transversely through the channels when they are aligned. Means 240 are also provided for selectively moving the portions 210, 220 axially relative to one another so as to wedge the in the channels 212, 222 to firmly and rigidly lock the portions to one another and thereby limit side-to-side swaying of the carrier. Means 240 may be like the set screw arrangement provided in bracket 80.

CARRIER FOR BICYCLES

FIGS. 14 and 15 illustrate a bike carrier 310 used in combination with the simplified form of bracket 200 (FIGS.

Figure 12:
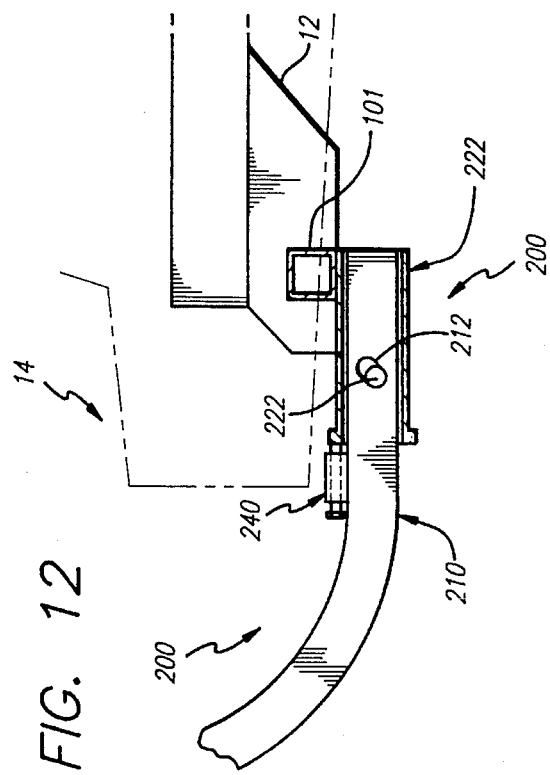
FIG. 12 is a schematic side view of another form of bracket, in its assembled condition.

12 and 13). A lower, forwardly directed extension or portion 320 of a carrier rod 316 is connected to the bracket 200 as described above in connection with FIGS. 12 and 13. An upright section 318 of the carrier rod 316 is provided at its upper end with a mounting hub 344 on which a transversely extending crosspiece 350 is secured. The crosspiece 350 has a pair of rearwardly extending spaced-apart arms 352 upon which one more bicycles 300 may be mounted. The illustrated arms 352 extend rearwardly and slightly upwardly with a short portion 353 at each of their outward rearmost ends being additional bent or inclined upwardly to aid in maintaining the bicycles upon the arms. A representative bicycle 300 is illustrated in broken line in the drawings in the mounted position upon the bike carrier 310. The bike 300 may be held in place on the carrier by suitable means such as bungi cords (not shown) as is common practice.

CARRIER FOR LUGGAGE

FIGS. 16 and 17 illustrate a luggage carrier 410 used in combination with the simplified form of support bracket 200. As shown best in FIG. 15, the carrier 410 has a support structure or rod 416 that does not have an upright section but only a forwardly directed horizontal support section or extension 420 that locks to the bracket 200 as described above in connection with FIGS. 12 and 13. The extension 420 supports a generally flat platform 450 upon which luggage 400 may be mounted. The platform 450 is generally rectangular and has an upwardly extending peripheral rail or fence 451 that may be of an open lattice type construction for partially enclosing the lower portions of luggage 400 mounted upon the platform. Two pieces of representative luggage 400 mounted on the platform 450 and within the confines of the railing 451 are illustrated in broken line in FIGS. 16 and 17. The luggage 400 may be secured in such position by suitable means such as bungi cords (not shown) which are commonly used for such purpose.

Various modifications may be made in the illustrated structure without departing from the spirit and scope of the present invention as set forth in the following claims.

For example, the cross-sections need not necessarily be square but might be other noncircular shapes that will prevent relative rotation while providing adequate support for the transverse locking pins.

For some applications the first and second bracket portions might be integrated together in their design or permanently fixed to one another as by welding, so long as circular and noncircular sections were provided. This would eliminate the need for a second locking pin arrangement. The illustrated arrangement bracket 80 is convenient, however, in that only the first portion needs to be fixed to the vehicle and the second bracket portion can be easily removed and stored when not in use by simply removing the locking pin 107.

It will also be noted that the illustrated carrier extension 20, contributes a functional portion of the bracket arrangement. If desired, the bracket could have a third portion in place of the extension 20, and such third portion could be suitably fixed to the carrier.

What is claimed is:

1. An improved bracket for firmly and rigidly supporting a support structure of a vehicle-mountable carrier, said bracket comprising;

a first portion for being rigidly connected to the carrier support structure, a second portion for being rigidly mounted oil a vehicle, one of said portions being elongated, having a central axis that extends generally horizontally, and having an elongated internal receptacle that is open at one end, the other of said portions being elongated, having a central axis that extends generally horizontally, and being configured to be assembled with the other portion by being received in said receptacle with the axes of the two portions generally co-aligned along a central axis, said other portion having an external shape in section that is slightly smaller than the shape in section of said receptacle, each of said portions having a means that defines an open channel that extends transversely of its portion, said channels being transversely co-aligned when said portions are assembly with one another in a predetermined relationship, an elongated locking member configured to be assembled with said portions by being inserted through said channels when they are co-aligned, each of said channels having a main section for aligning with the other of said channels when said portions are in said predetermined relationship, and one of said channels having a secondary section that extends away from its associated main section in a direction at an angel to said central axis, said one of said channels being formed by a pair of openings in opposite sides of the associated bracket portion and a transverse plate section fixed in place between the openings that provides an angled surface that is aligned with an edge of the secondary section of that channel and is thereby positioned to engage the locking member assembled to extend through that channel, means for selectively causing relative axially movement of the assembled portions with regard to one another to a locked position where wedging action between said secondary channel section and said locking member caused by such relative axial movement serves to firmly and rigidly lock the portions to one another against tilting movement therebetween, said means also maintaining the portions in such locked position.

2. The bracket claim 1 wherein said main channel sections generally intersect said central axis, said main channel sections being generally circular in cross-section and said secondary section being a generally smooth extension of its associated circular main section.

3. The bracket of claim 1 wherein said support structure includes an upright section that supports holder means for skis.

4. The bracket of claim 1 wherein said support structure supports includes an upright section that supports holder means for bicycles.

5. The bracket of claim 1 wherein said support structure includes or generally horizontal rearwardly extending section that supports holder means for luggage.

6. The bracket of claim 5 wherein said holder means comprises a generally horizontal platform.

7. The bracket of claim 6 wherein said holder means also includes an upright railing extending at least partially around said platform.

8. An improved bracket for firmly and rigidly supporting a support structure of a vehicle-mountable carrier while allowing the carrier to be selectively moved out of the way, said bracket comprising;

a first portion for being rigidly connected to the carrier support structure, a second portion for being rigidly mounted on a vehicle, one of said portions having a first section that is elongated, has a central axis that extends generally horizontally, and has an elongated internal receptacle that is open at one end and has a noncircular cross-section, the other of said portions having a first section that is elongated, has a central axis that extends generally horizontally, and has a noncircular external cross-section slightly smaller than that of said receptacle, to be assembled with the other first section by being received in said receptacle with the axes of the two sections generally co-aligned along a central axis, each of said first sections having a means that defines an open channel that extends transversely of its section, said channels being transversely co-aligned when said sections are assembly with one another in a predetermined relationship, an elongated locking member configured to be assembled with said sections by being inserted through said channels when they are co-aligned, each of said channels having a main section for aligning with the other of said channels when said portions are in said predetermined relationship, and one of said channels having a secondary section that extends away from its associated main section in a direction at an angle to said central axis, said one of said channels being formed by a pair of openings in opposite sides of the associated bracket portion and a transverse plate section fixed in place between the openings that provides an angled surface that is aligned with an edge of the secondary section of that channel and is thereby positioned to engage the locking member assembled to extend through that channel, means for selectively causing relative axially movement of the assembled portions with regard to one another to a locked position where wedging action between said secondary channel section and said locking member caused by such relative axial movement serves to firmly and rigidly lock the portions to one another against tilting movement therebetween, said means also maintaining the portions in such locked position, one of said portions also having a second section axially aligned with its first section, said second section having an elongated annular pivot surface that is circular in cross-section and proportioned to mate with the noncircular cross-section of the first section of the other of said portions to afford pivoting movement between said portions when said second section is overlapped with said mating first section, and means for selectively maintaining said first sections either overlapping and locked against relative rotation or nonoverlapping but with said second section and the mating first section overlapping so as to allow such relative rotation.

9. The bracket of claim 8 wherein said noncircular cross-sections are generally rectangular.

10. The bracket of claim 8 wherein said means for causing axial movement comprises an axially extending set screw.

11. The bracket of claim 8 wherein said first portion is connected to the carrier support structure by means defining a second pair of transverse channels and a second locking member.

12. The bracket of claim 8 wherein said main channel sections generally intersect said central axis, said main channel sections being generally circular in cross-section and said secondary section being a generally smooth extension of its associated circular main section.

* * * * *